Feb. 20, 1962        M. C. SMITH, JR        3,021,572

METHOD OF MAKING A BOTTOM STRUCTURE FOR SHOES

Filed March 27, 1957        2 Sheets-Sheet 1

Inventor
Maurice C. Smith, Jr.
by Roberts, Cushman Grover
Attys

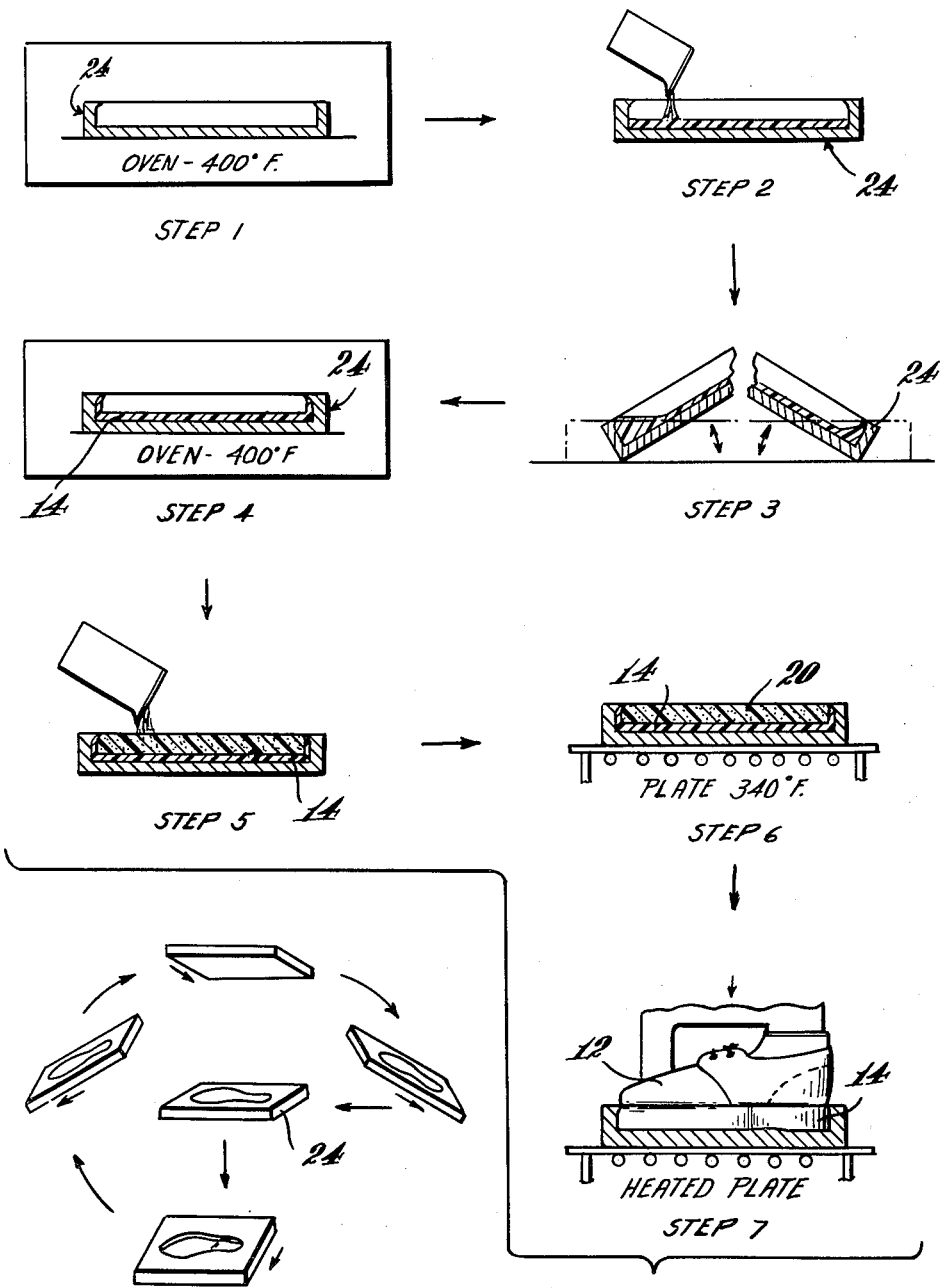

United States Patent Office 3,021,572
Patented Feb. 20, 1962

3,021,572
METHOD OF MAKING A BOTTOM STRUCTURE FOR SHOES
Maurice C. Smith, Jr., Bristol, R.I., assignor to Marbill Company, Providence, R.I., a corporation of Rhode Island
Filed Mar. 27, 1957, Ser. No. 648,870
1 Claim. (Cl. 18—58)

This invention relates to the manufacture of footwear, especially to footwear having an upper of leather, canvas or synthetic and a rubber or rubber-like bottom structure, such as tennis shoes, sneakers, slippers, sport shoes and the like.

An object of this invention is to provide a method of making a shell-like bottom structure for a shoe comprised of a sole and an upper or foxing flange with or without a cushion layer in such a way as to avoid the waste and losses heretofore encountered with slush and pressure molding processes. Another object is to provide a method of making shell-like bottom structures and attaching them directly to the bottoms of lasted shoes without need for bottom laying and vulcanizing presses. Another object is to provide a method of attachment which produces a bond which will be permanent throughout the life of the footwear. Other objects are to provide a method which is suitable for large scale production, requires a minimum amount of equipment and skill and is economical to practice.

As herein illustrated, the method comprises tilting or rocking a heated mold containing a predetermined quantity of fluid plastisol about a vertical axis progressively to flow the plastisol upwardly on the wall of the mold to its rim and lengthwise of the wall all the way around to form a shell comprised of a sole and wrapper integral therewith, reheating the shell to cause further gelling of the plastisol shell and optionally fusing the shell and stripping it from the mold or placing in the shell while still within the mold a predetermined quantity of sponge-forming compound, heating the mold containing the shell and sponge-forming compound until the sponge-forming ingredients are activated and the gases freed thereby expelled, pressing a lasted upper against the sponge surface and heating the upper and bottom structure until the sponge surface and edges of the wrapper become fused to the lasting margin of the upper.

The invention will now be described in greater detail with reference to the accompanying drawings wherein:

FIG. 7 is a perspective view of the mold showing it in its various positions for distribution of the plastisol about its peripheral wall, the several positions being spread apart to avoid confusion; and FIG. 8 is a step by step diagram of the method followed in making the sole and applying it to the lasted upper.

Figure 1:
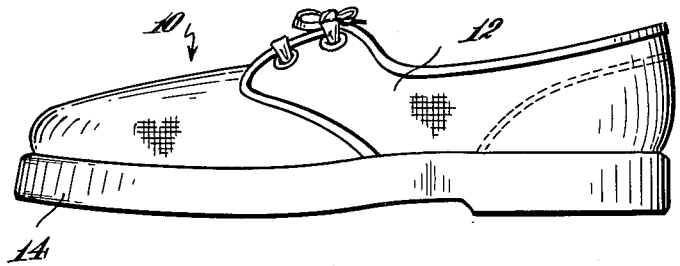
FIG. 1 is an elevation of a canvas shoe having a rubber-like bottom structure including a sole and wrapper.

Referring to the drawings, there is shown in FIG. 1, a sport shoe 10 of the type having a top 12 of leather, canvas, synthetic and the like, and a bottom structure 14 of rubber or rubber-like compound, the latter comprising a sole member 16 and a wrapper 18. Such shoes are used extensively for casual wear and more frequently than not, include a sponge layer 20.

The term "wrapper" as used herein refers to the broad strip 18 which extends peripherally of the base of the shoe and covers the junction between the top surface of the sole and the bottom surface of the lasted upper. Such a strip when applied by means of adhesive is conventionally known as a "foxing" strip, but since in this application it is an integral part of the sole so that it is not in fact a strip it is referred to here as a wrapper or as a foxing flange.

Figure 2:
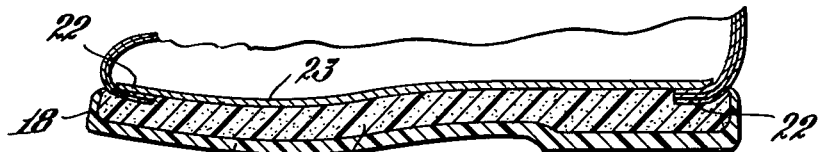
FIG. 2 is a vertical section taken longitudinally of the the shoe shown in FIG. 1, showing the cushion layer within the shell formed by the sole and wrapper.
Figure 3:
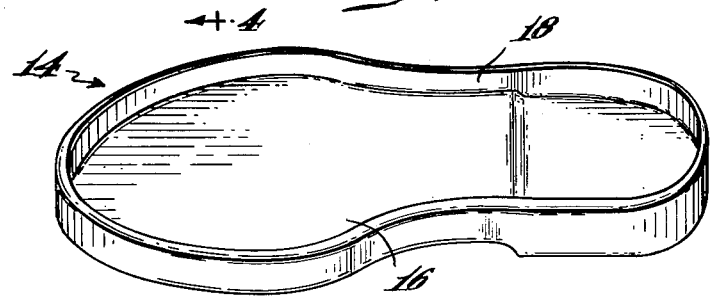
FIG. 3 is a perspective view of the bottom structure prior to attachment to the shoe with the cushion layer omitted.
Figure 4:
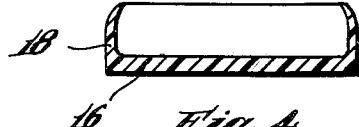
FIG. 4 is a transverse section of the bottom structure taken on the line 4—4 of FIG. 3.

As shown in FIG. 2, the sponge layer 20 is quite thick so as to afford a maximum amount of foot comfort and is sheathed at its bottom and peripheral edge by the sole 16 and the wrapper 18, which form an integral shell which is wear-resistant and impervious to moisture and dirt. The sponge layer and shell are bonded together and the inner surface of the sponge layer is bonded to the lasting margin 22 of the upper. An insole member 23 covers the inwardly extending lasting margin and the upper surface of the sponge layer.

Figure 2A:
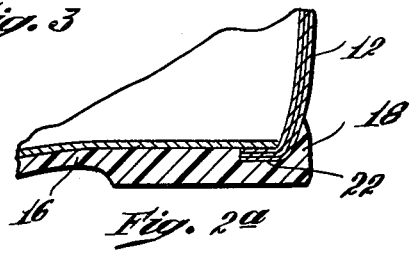
FIG. 2a is a fragmentary view of a shoe upper with the shell bottom attached directly thereto without an intermediate sponge layer.

If desired the sponge layer 20 may be omitted and the shell comprised of the sole 16 and wrapper 18 may be attached directly to the bottom of the lasted shoe, as shown fragmentarily in FIG. 2a, in which case the wrapper becomes more nearly like a foxing strip since it covers and protects a substantial portion of the lower part of the upper.

Figure 5:
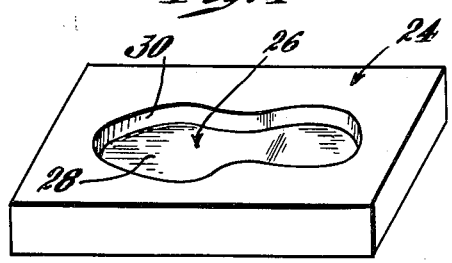
FIG. 5 is a perspective view of the mold.
Figure 6:
FIG. 6 is a vertical fragmentary section of the mold to larger scale, taken transversely thereof.

One purpose of this invention is to provide a method of making a bottom structure in the form of a shell consisting of a sole and integral wrapper or foxing flange with a more uniform sole and flange formation, for attachment to the lasting margin of an upper. This is accomplished herein by providing a mold 24 (FIG. 5), of suitable metal, for example cast aluminum which contains a mold cavity 26 having a bottom 28 corresponding in area and shape to the bottom of the shoe to be made and a peripheral wall 30 corresponding in height to the height of the wrapper desired. As will be seen by reference to FIG. 6, the wall 30 of the mold slopes inwardly near its rim, being concave so that the top opening of the mold is smaller in area than the bottom of the mold and so that this top opening corresponds substantially to the profile of the last at the shoulder about which the lasting margin of the upper is drawn. It is to be understood however that the walls may be perpendicular if desired without departing from the spirit of the invention herein disclosed. The bottom surface of the mold and the wall may be appropriately contoured to provide for a ground gripping external surface on the sole and a decorative surface on the wrapper. The convexity of the wall 30 shapes the wrapper, as will appear hereinafter, so that when the shell is attached to the upper it makes a neat pleasing appearance at its junction with the upper.

In accordance with the invention, the bottom structure, that is, the shell comprised of the sole 16 and wrapper 18 may be made and sold to shoe manufacturers who do not have facilities for such manufacture for attachment to uppers prepared by them or as a shell filled with a sponge composition, or the completed shoe may be made as the end product of a series of steps performed by one manufacturer starting with the formation of the bottom structure, the filling thereof with the sponge material and finally the attachment to the lasting margin of the upper. When the sole is in the form of a shell filled with a sponge composition a fabric such as terry cloth may be molded to the top area of the sponge during the formation of the sole, as shown for example in the pending application of Jeremias Andrade et al., Serial No. 563,962, filed February 7, 1956, now Patent No. 2,963,738, to insure better adhesion between the sole and bottom of the lasted upper.

As a first step the mold 24 is heated, reference being had to the diagram (FIG. 8), in an oven or other suitable heating means at a temperature of 400° F. for 6 minutes. A higher oven temperature would, of course, require a lesser time and a lower oven temperature a greater time. The mold is now removed from the oven and a predetermined quantity of fluid plastisol is poured into the mold (step 2), whereupon the mold is tilted or rocked, as shown in step 3, about a substantially vertical axis so as progressively to flow the fluid plastisol up to the rim of the mold wall and then lengthwise thereof all the way around the mold, thereby to cause a layer of plastisol to become gelled on the wall. The rocking of the mold from an initial horizontal position, forwardly, then downwardly to the left, then downwardly to the rear, then downwardly to the right, and finally back to a horizontal position, are shown more explicitly in FIG. 7. It may be necessary to rock the mold several times through the successive positions illustrated to procure a wrapper of the desired thickness and the rocking should be carried out with a uniform motion so that the cross-section of the wrapper will be uniform all the way around the sole. It is, of course, obvious that the rocking motion can be started in any direction so long as the circuitous rocking motion is carried out in such fashion as to distribute the plastisol uniformly and continuously along the wall from the starting point all the way around and back to the original starting point. It is necessary to preheat the mold to accomplish proper distribution of the plastisol for the reason that if the plastisol is placed in a cold mold and then the mold containing the liquid plastisol is heated to a temperature sufficient to produce gelation the body of fluid plastisol gels too fast, thus making it impossible to flow the plastisol all the way around the wall. Just enough plastisol is introduced into the mold to provide for the proper bottom and wall thickness without an excess so that it is not necessary to pour out excess plastisol. This eliminates irregularities in the wall thickness and waste of plastisol.

Following proper distribution of the plastisol the mold with the plastisol spread over its bottom and peripheral wall is placed in an oven (step 4) and heated at a temperature of 400° for one minute so as to gel the plastisol and thus to form a shell within the mold which is partially fused. At this point in the procedure the shell may be further heated to complete fusing by subjecting it to heating in the oven for an additional 15 minutes at a temperature of 375°. The mold may then be removed and cooled, for example by immersion in water, whereupon the shell may be stripped from the mold. Such shell units may be supplied to manufacturers who are not equipped to make them for application by suitable means to the lasted bottom of an upper. For example, one or two coats of a self-curing adhesive may be applied to the inside surface of the shell and to the bottom of a lasted shoe upper. After a drying period the lasted upper and the shell are placed together and preferably subjected to a rolling operation to bring the adhesive coated surfaces into intimate contact. Following this the shoe is left to cure for a suitable period, whereupon the last is removed from the upper and the shoe is completed.

Where the entire shoe is to be manufactured as a continuous operation, or at least in one factory, following the one minute period of gelation at 400° a predetermined quantity of fluid sponge-forming composition is placed in the shell (step 5) while still within the mold. The quantity of sponge-forming composition is such as to fill the shell up to approximately its upper edge, as shown in step 5. Following this the mold together with the shell and the sponge-forming composition are placed on a heating unit (step 6) at a temperature of 340° and left therein for a period of 8 minutes, uncovered, so as to allow the sponge-forming ingredients to activate and to release the gases generated thereby. If for some reason it is not desirable to leave the mold open, vents or other suitable means may be employed for permitting the escape of the generated gas. A lasted upper is now placed on the sponge surface (step 7) and held thereagainst under enough pressure to hold it in intimate contact with the sponge surface, for a period of 15 minutes. The mold and shoe are then removed from the heating unit and cooled either with water or refrigerant. Following cooling the last may be removed from the upper and the upper with the sole attached thereto stripped from the mold.

It is apparent from the foregoing that with very little equipment, as compared to the sole molding and sole attaching machines heretofore employed for molding an attaching outsole to uppers, that by the practice of the present invention bottoms may be molded and attached to uppers quickly and efficiently with the least amount of technical skill and with a certainty of securing a permanent bond. The method of attaching a bottom to an upper is applicable to upper materials of leather and fabric of natural or synthetic fiber such as nylon and the like.

Throughout the description of the method the composition employed for making the rubber-like outsole is referred to as "plastisol" which is a polyvinyl chloride resin dispersed in a liquid plasticizer along with sutable colors, stabilizers and other modifying agents. For ease in use the compound has a low viscosity so as to be easily pourable. Such compounds may be fused with substantially no shrinkage so that they take a very accurate and faithful impression of the mold. The sponge composition is provided by incorporating in the polyvinyl chloride suitable foaming agents.

It is to be understood that while plastisol is employed herein any equivalent composition may be substituted therefor.

The temperature and times recited are inversely proportional within limits, in that increased temperatures may be used with shorter time periods while lower temperatures may be employed with longer time periods. The times and temperatures are, however, limited herein by the fact that too high a temperature may destroy or at least injure both the bottom and upper material and too long a time may make the manufacture uneconomical. The quantities of plastisol used will vary directly with the size of the shoe to be made and these are usually predetermined so that the exact quantity required for making each bottom unit may be placed in the mold without an excess thereby obtaining a maximum economy in manufacture, a distinct advantage over the prior methods wherein the mold is initially filled and then the excess is poured out and reused but always with a loss and with a deterioration in the quality of the reused plastisol and also from pressure molding processes where the excess is discharged by displacement and for the most part lost.

It should be understood that the present disclosure is for the purpose of illustration only and that this invention includes all modifications and equivalents which fall within the scope of the appended claims.

I claim:

A method of making a bottom structure for shoes comprising: providing an open top mold having a bottom part corresponding in shape to the sole of the shoe and a side wall part at least a portion of which corresponds in shape to a foxing flange; heating the mold; pouring a quantity of plastisol just sufficient to form a sole and foxing flange into the upright mold; tipping the mold progressively around a perpendicular axis sufficiently to flow the plastisol just up to the top of said portion of the side wall part, the plastisol gelling on said portion thereby to form a foxing flange; righting the mold; and reheating the mold to cause further gelling of the plastisol and to cure the thereby formed sole and foxing flange.

(References on following page)

References Cited in the file of this patent

UNITED STATES PATENTS

| | | |
|---|---|---|
| 1,751,766 | Smith | Mar. 25, 1930 |
| 2,256,329 | Szerenyi et al. | Sept. 16, 1941 |
| 2,382,784 | Emery | Aug. 14, 1945 |
| 2,671,932 | Pique | Mar. 16, 1954 |
| 2,696,024 | Mobley et al. | Dec. 7, 1954 |
| 2,770,557 | Atti | Nov. 13, 1956 |
| 2,880,468 | Mooney | Apr. 7, 1959 |

FOREIGN PATENTS

| | | |
|---|---|---|
| 161,422 | Australia | Feb. 23, 1955 |
| 725,100 | Great Britain | Mar. 2, 1955 |